United States Patent
Terwilliger et al.

(10) Patent No.: US 12,215,622 B1
(45) Date of Patent: Feb. 4, 2025

(54) PARTIAL EXHAUST CONDENSATION INTERCOOLING

(71) Applicant: RTX CORPORATION, Farmington, CT (US)

(72) Inventors: Neil J. Terwilliger, Cheshire, CT (US); Lance L. Smith, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/457,458

(22) Filed: Aug. 29, 2023

(51) Int. Cl.
*F02C 7/141* (2006.01)
*F02C 3/06* (2006.01)
*F02C 7/143* (2006.01)
*F02C 7/16* (2006.01)

(52) U.S. Cl.
CPC .............. *F02C 7/1435* (2013.01); *F02C 3/06* (2013.01); *F02C 7/16* (2013.01); *F05D 2220/323* (2013.01); *F05D 2260/212* (2013.01); *F05D 2260/609* (2013.01)

(58) Field of Classification Search
CPC ........ F02C 7/141; F02C 7/143; F02C 7/1435; F02C 7/16; F02C 3/06; F05D 2220/323; F05D 2260/212; F05D 2260/609
See application file for complete search history.

(56) References Cited

U.S. PATENT DOCUMENTS

| 5,535,584 | A | * | 7/1996 | Janes | F02C 6/003 60/39.12 |
| 6,199,363 | B1 | * | 3/2001 | Frutschi | F02C 7/08 60/39.55 |
| 11,603,798 | B1 | | 3/2023 | Terwilliger et al. | |
| 11,686,222 | B2 | | 6/2023 | Hu | |
| 2004/0182330 | A1 | * | 9/2004 | Frutschi | F02C 3/30 60/320 |
| 2005/0223712 | A1 | * | 10/2005 | Briesch | F02C 7/143 60/39.465 |

FOREIGN PATENT DOCUMENTS

| CA | 3132260 | A1 | * | 9/2020 | .............. B64D 27/12 |
| CN | 105715382 | A | * | 6/2016 | .............. F25B 25/00 |

* cited by examiner

*Primary Examiner* — Steven M Sutherland
(74) *Attorney, Agent, or Firm* — Carlson, Gaskey & Olds, P.C.

(57) ABSTRACT

An aircraft propulsion system includes a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, the exhaust gas flow is split into at least a first exhaust gas flow and a second exhaust gas flow, and a condenser where water is extracted from the second exhaust gas flow, and a first heat exchanger where at least a portion of the extracted water is utilized for cooling a core flow along the core flow path.

18 Claims, 5 Drawing Sheets

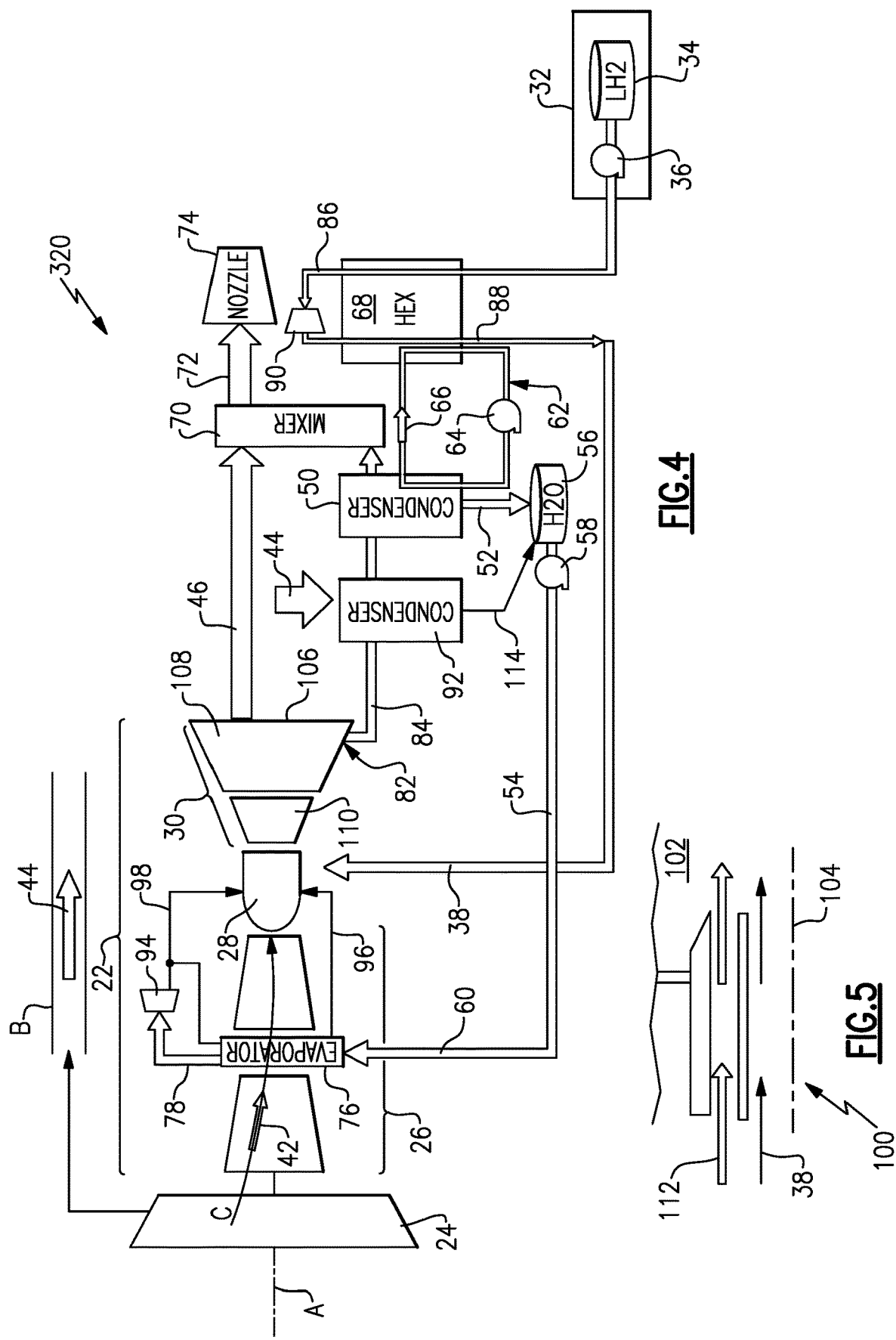

PARTIAL EXHAUST CONDENSATION INTERCOOLING

TECHNICAL FIELD

The present disclosure relates generally to an aircraft propulsion system that extracts water from a partial portion of the exhaust gas flow.

BACKGROUND

Reduction and/or elimination of carbon emissions generated by aircraft operation is a stated goal of aircraft manufacturers and airline operators. Turbine engines compress incoming core airflow, and mix the compressed airflow with fuel that is ignited in a combustor to generate an exhaust gas flow. Steam injection can provide improved propulsive efficiencies. Water recovered from the exhaust gas flow may be transformed into steam using thermal energy from the exhaust gas flow. Aircraft propulsion systems may not have sufficient heat absorption capacity to efficiently condense and extract sufficient amounts of water for all desired operational uses.

SUMMARY

An aircraft propulsion system according to an exemplary embodiment of this disclosure includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, the exhaust gas flow is split into at least a first exhaust gas flow and a second exhaust gas flow, and a condenser where water is extracted from the second exhaust gas flow, and a first heat exchanger where at least a portion of the extracted water is utilized for cooling a core flow along the core flow path.

In a further embodiment of the foregoing, the aircraft propulsion system includes a fuel system for communication of a fuel flow to the combustor section. A portion of the fuel flow is in thermal communication with the condenser for cooling the second exhaust gas flow.

In a further embodiment of any of the foregoing, the aircraft propulsion system includes a refrigerant circuit heat exchanger for transferring thermal energy between the condenser and a cold sink.

In a further embodiment of any of the foregoing aircraft propulsion systems, the cold sink includes a cryogenic fuel flow and further includes a turboexpander where a portion of a heated fuel flow is expanded to generate a cooled fuel flow that is thermally communicated with the refrigerant circuit.

In a further embodiment of any of the foregoing, the aircraft propulsion system further includes a control device that is configured to vary a ratio of the first exhaust gas flow to the second exhaust gas flow and a controller that is programmed to operate the control device based information indicative of at least one operating condition.

In a further embodiment of any of the foregoing, the aircraft propulsion system includes a secondary condenser where a fan bypass airflow is placed in thermal communication with the second exhaust gas flow.

In a further embodiment of any of the foregoing aircraft propulsion systems, the heat exchanger is in thermal communication with a portion of the core flow where the extracted water flow is heated to generate a steam flow, and the steam flow is injected into the core flow path.

In a further embodiment of any of the foregoing aircraft propulsion systems, the steam flow is communicated to a fuel nozzle of the combustor section for injection with a flow of fuel.

In a further embodiment of any of the foregoing aircraft propulsion systems, at least a portion of the extracted water is injected as an intercooling flow into the core flow path through at least one injection location.

In a further embodiment of any of the foregoing, the aircraft propulsion system includes an exhaust flow turbine through which the first exhaust gas flow is expanded to generate shaft power.

In a further embodiment of any of the foregoing, the aircraft propulsion system further includes a mixer where the first exhaust gas flow and the second exhaust gas flow are recombined and exhausted through a nozzle.

In a further embodiment of any of the foregoing, the aircraft propulsion system further includes a controller that is programmed to operate at least one control device that is configured to control recombination of the first exhaust gas flow and the second exhaust gas flow. The at least one control device includes one of a turbine, a valve, or the mixer.

In a further embodiment of any of the foregoing aircraft propulsion systems, the first exhaust gas flow is exhausted from an aft exit of the turbine section and the second exhaust gas flow is tapped from a location in the turbine section that is upstream of the aft exit.

In a further embodiment of any of the foregoing aircraft propulsion systems, the second exhaust flow is of a flow volume that is less than that of the first exhaust gas flow.

A turbine engine assembly according to another exemplary embodiment of this disclosure includes, among other possible things, a core engine that defines a core flow path and that is configured to generate an exhaust gas flow, a condenser that is configured to receive a partial portion of the exhaust gas flow and to extract water from the partial portion of the total exhaust gas flow, and a first heat exchanger where at least a portion of the extracted water is utilized for cooling a core flow along the core flow path.

In a further embodiment of the foregoing turbine engine assembly, the first heat exchanger is in thermal communication with a portion of the core flow where the extracted water flow is heated to generate a steam flow, and the steam flow is injected into the core flow path.

In a further embodiment of any of the foregoing turbine engine assemblies, the partial portion of the exhaust gas flow is tapped from a location in the turbine section that is upstream of an aft exit.

In a further embodiment of any of the foregoing, the turbine engine assembly includes a fuel system that generates a fuel flow. A portion of the fuel flow is in thermal communication with a refrigerant circuit for cooling the partial portion of the exhaust gas flow.

A method of operating a turbine engine including a cryogenic fuel system according to another exemplary embodiment of this disclosure includes, among other possible things, cooling a partial portion of a total exhaust gas flow to condense water into a liquid form, a portion of a cryogenic fuel flow from the cryogenic fuel system accepts thermal energy from the partial portion of the total exhaust gas flow, extracting liquid water from the partial portion of the exhaust gas flow, and cooling a portion of a core flow along a core flow path by injecting a portion of the extracted water into the core flow path.

In a further embodiment of the foregoing, the method further includes generating a steam flow from at least a portion of the extracted water and injecting the generated steam flow into a core flow path of the turbine engine.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a schematic view of still another example aircraft propulsion system embodiment.

FIG. 5 is a schematic view of an example combined fuel and steam nozzle.

DETAILED DESCRIPTION

Figure 1:
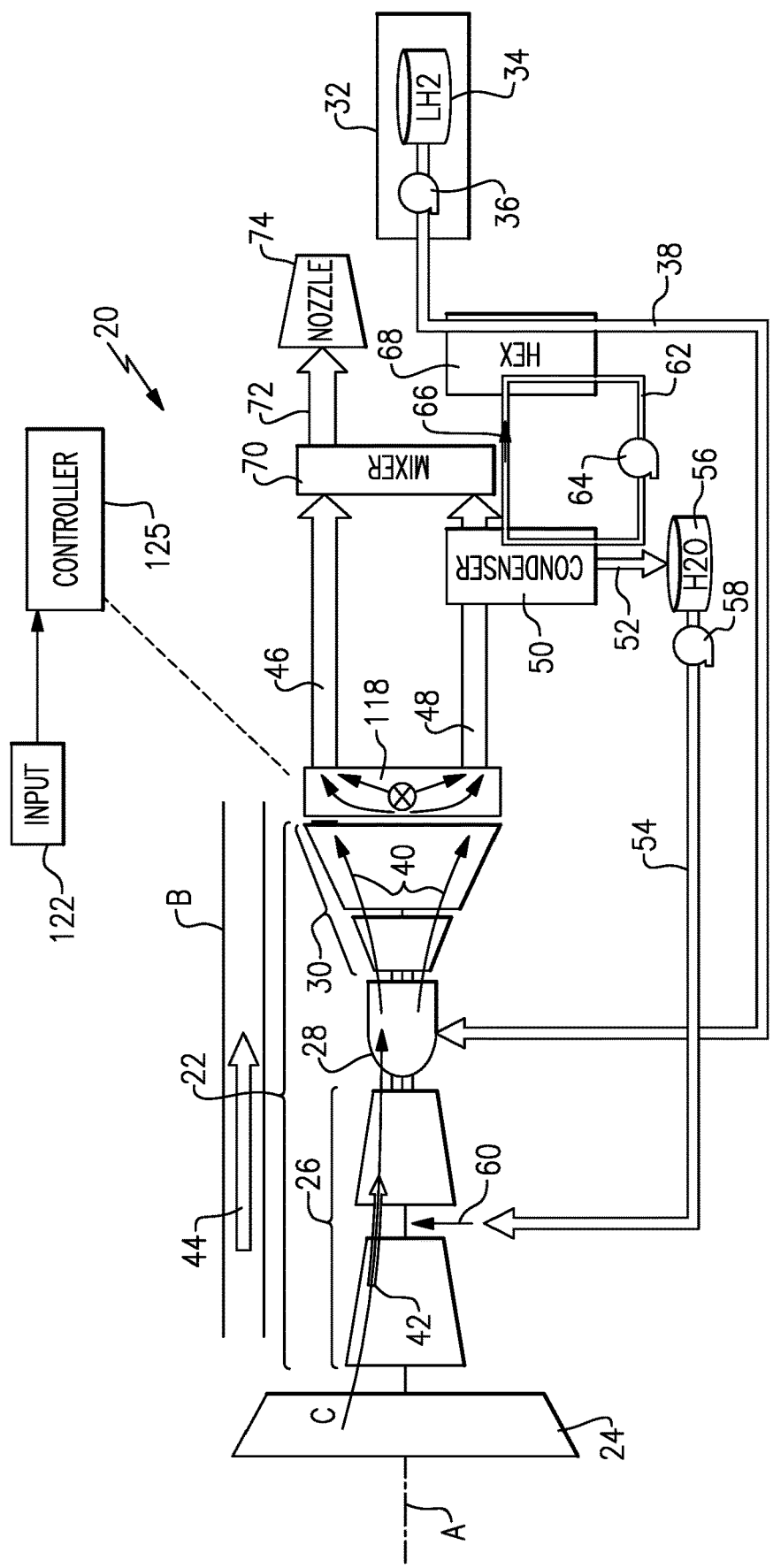
FIG. 1 is a schematic view of an example aircraft propulsion system embodiment.

FIG. 1 schematically illustrates an example propulsion system 20 that extracts water from a partial portion of the exhaust gas flow and applies the extracted water to targeted uses to improve engine efficiency. In one example embodiment, the extracted water is utilized for intercooling and is injected into a core flow. Example system embodiments are disclosed that illustrate additional features complimentary to extraction of water from only a partial portion of the exhaust gas flow.

The example propulsion system 20 includes a fan section 24 and a core engine 22. The core engine 22 includes a compressor section 26, a combustor section 28 and the turbine section 30 disposed along an engine longitudinal axis A. The fan section 24 drives a bypass airflow 44 along a bypass flow path B, while the compressor section 26 draws a core flow 42 along a core flow path C. The core flow 42 is compressed and communicated to the combustor section 28 where the compressed core flow 42 is mixed with a fuel flow 38 and ignited to generate an exhaust gas flow 40. The exhaust gas flow 40 expands through the turbine section 30 where energy is extracted and utilized to drive the fan section 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 32, including at least a fuel tank 34 and a fuel pump 36, provides the fuel flow 38 to the combustor 28. The example fuel system 32 is configured to provide a hydrogen based fuel such as a liquid hydrogen ($LH_2$).

Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

A condenser 50 is disposed downstream of the turbine section 30 and receives a partial portion of the exhaust gas flow 40. The condenser 50 cools a portion of the exhaust gas flow 40 to condense and extract water 52. Extracted water 52 is gathered in a tank 56 and pressurized by a pump 58 for communication to targeted locations within the core engine 22.

The exhaust gas flow 40 is a mix of steam, and components from combustion of fuel. The components from combustion can include, among other possible components, nitrogen, carbon dioxide and oxygen. These combustion components reduce the case of condensing liquid water from the exhaust gas flow 40 in the condenser 50. Moreover, cold sinks such as the bypass airflow 44 and the cryogenic fuel flows 38 have a limited capacity for cooling that may further limit condenser operation. The example propulsion system provides for improved condenser operation by separating the exhaust gas flow 40 into a first exhaust gas flow 46 and a second exhaust gas flow 48. Only the second exhaust gas flow 48 is communicated to the condenser 50.

In one disclosed example, the second exhaust gas flow 48 is equal to or less than that of the first exhaust gas flow 46. In another disclosed example, the second exhaust gas flow 48 is less than about 40% of the total exhaust gas flow 40. In yet another example, the second exhaust gas flow 48 can include more than 50% of the total exhaust gas flow 40. The first and second exhaust gas flows 46, 48 are recombined in a mixer 70 to form a recombined flow 72 that is exhausted through a nozzle 74. The mixer 70 is configured to accommodate pressure differences that may be present between the first and second exhaust gas flows 46, 48 to produce the recombined flow 72.

In one disclosed example embodiment, a control device 118 is provided to control and vary the split between the first and second exhaust gas flows 46, 48. The example control device 118 is controlled by a controller 125 based on input information 122 indicative of engine operation. The control device 118 may be any structure or duct that is controllable to vary a ratio of flows provided into each of the first and second exhaust gas flows 46, 48. Moreover, although the control device 118 is illustrated at the exit of the turbine section 30, the control device 118 may be arranged in any manner or location that provides control over the proportion that the exhaust gas flow 40 is split into the first exhaust gas flow 46 and the second exhaust gas flow 48.

The example controller 125 is a device and/or system for performing necessary computing or calculation operations to facilitate operation of the control device 118. The controller 125 may be specially constructed and programmed for operation of the control device 118, or it may comprise at least a general-purpose computer selectively activated, programmed, and/or reconfigured by software instructions stored in a memory device. The controller 125 may further be part of full authority digital engine control (FADEC) or an electronic engine controller (EEC).

A refrigerant circuit 62 provides for cooling of the second exhaust gas flow 48 within the condenser 50. In one example embodiment, the refrigerant circuit 62 includes a pump 64 for circulating coolant 66 to transfer heat away from the second exhaust gas flow 48. The coolant 66 may be any coolant including, among other things, helium, glycol, and ammonia. The coolant 66 circulates through a heat exchanger 68 to further transfer heat into the fuel flow 38, which may be cryogenic. Accordingly, the refrigerant circuit 62 provides for the transfer of heat from the second exhaust gas flow 48 to the fuel flow 38.

Water 52 extracted from the second exhaust gas flow 48 within the condenser 50 is gathered in the tank 56. A pump 58 pressurizes the extracted water to generate a pressurized water flow 54. The water flow 54 is communicated to the core engine 22 for use in targeted locations to improve engine efficiency. In one disclosed example, the water flow 54 is communicated as an intercooling flow 60 and injected into the core flow 42 within the compressor section 26. In the disclosed example, the intercooling flow 60 is directly injected into the core flow 42 for both cooling and to increase mass flow through the combustor 28 and turbine section 30. Although depicted as being injected within the compressor section 26, this is not intended to be so limiting and the water 54 may be injected in other locations of the propulsion system 20.

Figure 2:
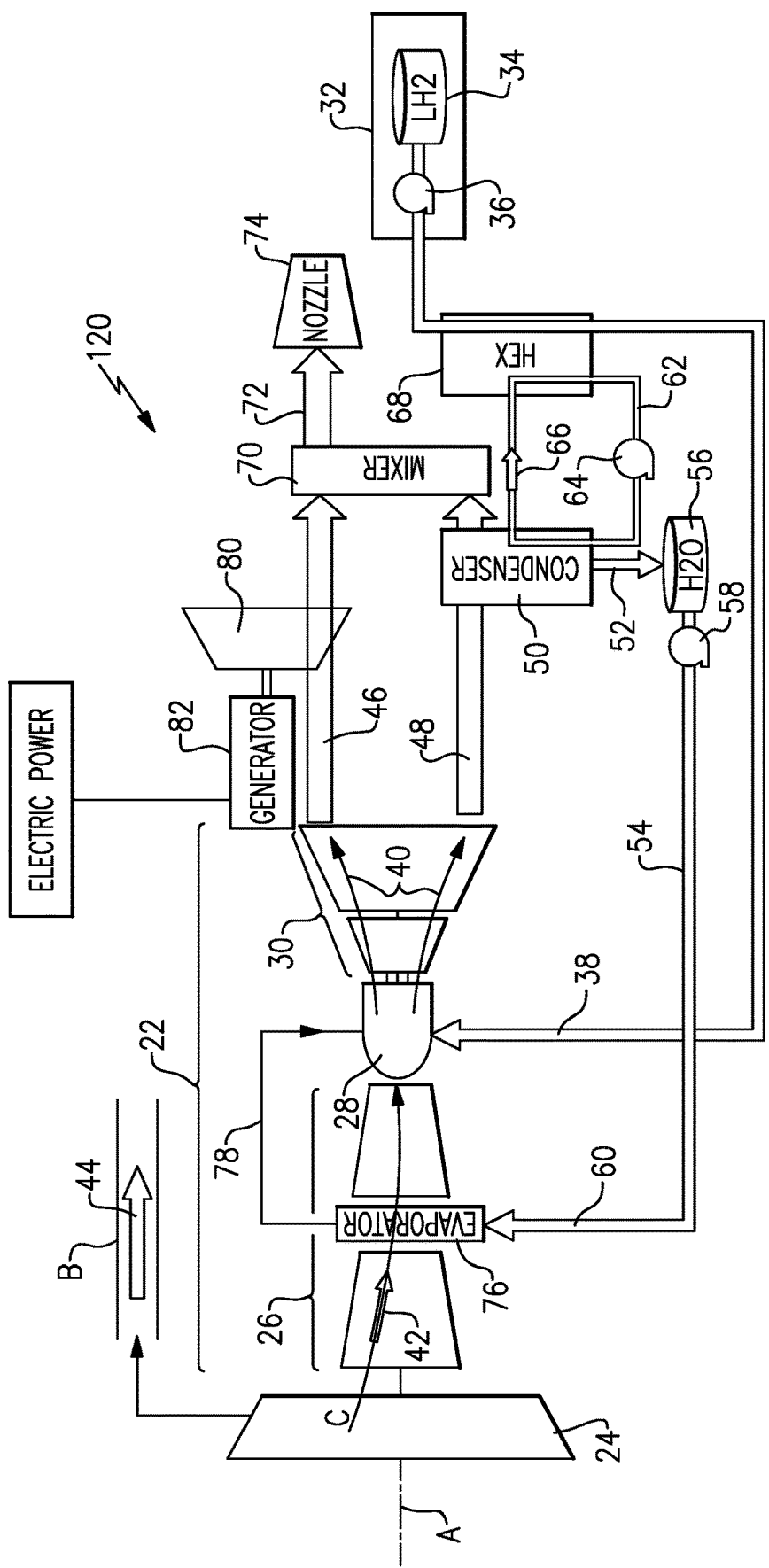
FIG. 2 is a schematic view of another example aircraft propulsion system embodiment.

Referring to FIG. 2, another example propulsion system is schematically shown and indicated at 120. The example propulsion system 120 includes a first heat exchanger in the form of an evaporator 76 disposed within the compressor section 26 for generating a steam flow 78. Instead of directly injecting water into the core flow 42 within the compressor section 26, the intercooling flow 60 is transformed into the steam flow 78 and injected into the combustor 28. Thermal energy from the core flow 42 is used to heat the intercooling flow 60 and in doing so, cools the core flow 42. The cooled core flow 42 increases compressor efficiency while the injected steam 28 provides an increased mass flow through the turbine section 30.

The separated first exhaust gas flow 46 and second exhaust gas flow 48 may be of different pressures upon reaching the mixer 70. However, operation of the propulsion system is more efficient if the two flows 46, 48 are of the same or substantially the same pressure. The second exhaust gas flow 48 is cooled and pressure is reduced as it flows through the condenser 50 as compared to the first exhaust gas flow 46. The imbalance of pressures is accommodated by an exhaust turbine 80 through which the first exhaust gas flow 46 is expanded. Expansion through the exhaust turbine 80 reduces pressure in the first exhaust gas flow 46 and also generates shaft power that can be utilized to drive accessory devices. In one example embodiment, the exhaust turbine 80 is coupled to a generator 82 to produce electric power. Although a generator 82 is shown by way of example, other accessory components and devices may be driven by the exhaust turbine 82.

Operation of the exhaust turbine 80 is controlled to provide similar pressures within each of the first and second exhaust gas flows 46, 48 as they are communicated to the mixer 70 for recombination. The exhaust turbine 80 may be controlled based on different sensed pressures within each of the gas flows 46, 48. Sensors may be provided that provide information indicative of different pressures within each of the flows 46, 48. Moreover, operation of the exhaust turbine 80 may be determined based on predefined engine operating conditions. In each example operating condition, the exhaust turbine 80 provides a means of matching pressures within the flows 46, 48 for communication into the mixer 70. The matching of the flows 46, 48 may include matching of pressures within a defined range and/or flow rates to provide efficient combination of the flows 46, 48 in the mixer.

Operation of the mixer 70 and the exhaust turbine 80 may be combined to provide for combination of the first and second exhaust gas flows into the recombined flow 72. In one disclosed example embodiment, the first and second exhaust gas flows 46, 48 are controlled to correspond with a heat capacity of the cryogenic fuel flow 38. In the disclosed example embodiment, control is provided by operation of the exhaust turbine 80 and the mixer 70. However, other control devices and actuators could be utilized to tailor operation to match a capacity of the cryogenic fuel flow 38 to accept thermal energy.

Figure 3:
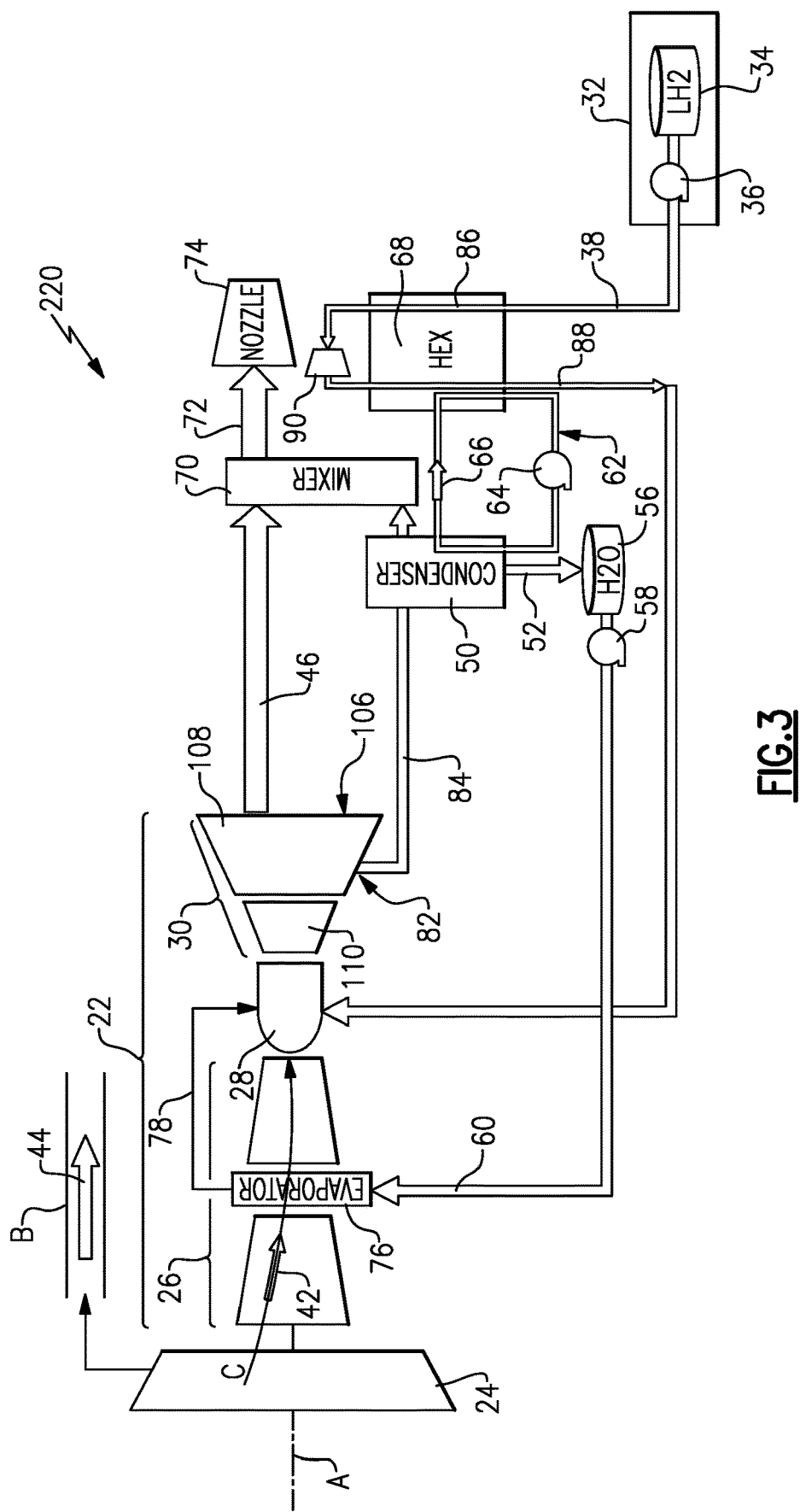
FIG. 3 is a schematic view of yet another example aircraft propulsion system embodiment.

Referring to FIG. 3, another example propulsion system 220 is schematically shown and includes a fuel turboexpander 90 to extract additional shaft power and to increase the capacity of the cryogenic fuel 38 to accept thermal energy. Additionally, a second exhaust gas flow 84 is taken from an earlier stage in the turbine section 30. In one example embodiment, the example turbine section 30 includes an aft turbine 108 and a forward turbine 110. The forward turbine is immediately downstream of the combustor 28. The aft turbine 108 is the last turbine section that is coupled to drive the compressor section 26 and fan 24. Moreover, the aft turbine 108 includes an aft exit 106 where the first exhaust gas flow 46 is emitted. Although an example turbine section configuration is shown and described by example, other turbine sections with different configurations could be utilized within the contemplation and scope of this disclosure.

The first exhaust gas flow 46 is emitted from the aft exit of the aft turbine 108. The second exhaust gas flow 84 is taken from a location 82 that is upstream of the aft exit 106. The location 82 provides exhaust gas flows at a higher pressure than is emitted through the aft exit 106. The increased pressure of the second exhaust gas flow 84 compensates for the pressure drop through the condenser 50 that is not experienced by the first exhaust gas flow 46. The location 82 is illustrated by way of example as disposed within an aft turbine section 108, but may be located anywhere within the turbine section 30 that provides pressures and temperatures that align with functioning of the condenser 50, matching flows in the mixer and that corresponds with a heat capacity provided by the cryogenic fuel flow 38.

The fuel turboexpander 90 provides a cooled portion 88 of the cryogenic fuel flow 38 that may provide an increased capacity to accept thermal energy. In one disclosed embodiment, a first portion 86 of the fuel flow 38 accepts heat within the heat exchanger 68. The heat comes from a combination of the refrigerant circuit 62 and a cooled portion 88 of the fuel flow. The first portion 86 of the fuel flow is expanded and cooled through the fuel turboexpander 90 and communicated back through the heat exchanger 68 to accept an additional amount of heat. The cooled portion 88 of the fuel flow 38 is communicated to the combustor 28. The increased cooling capacity of the cooled portion 88 of the fuel flow 38 accommodates increased temperatures that may be incurred by taking the second exhaust gas flow 84 from an earlier stage of the turbine section 30.

Referring to FIG. 4, another example propulsion system 320 is shown schematically and includes a steam turbine 94 for extracting work and reheating of a steam flow. The steam flow 78 is expanded through the steam turbine 94 to extract mechanical power. The mechanical power could drive accessory components for other engine systems. Expanded steam flow 94 may be directed back through the evaporator 76 for reheating or directed as a steam flow 98 for injection into the combustor 28. In one example embodiment, steam flow is routed back through the evaporator 76 where it accepts additional thermal energy to generate a reheated steam flow 96. The reheated steam flow 96 is injected into the combustor 28.

Alternatively, the expanded flow 98 is not rerouted, but is directly injected into the combustor 28. The expanded flow 98 may be a cooled steam flow, or may be a combination of liquid and steam that is injected into the combustor 28. Moreover, steam exiting the steam turbine 94 may be routed as a combination and communicated directly to the combustor as the expanded flow 98 and directed through the evaporator and provided to the combustor as the reheated flow 96. The proportion between the flows 96, 98 may be varied to adapt to engine specific operating conditions.

Additionally, the example propulsion system 320 includes a second condenser 92 that is disposed upstream of the condenser 50. The second condenser 92 is cooled by a different cold sink source than the condenser 50. In the illustrated example, the second condenser 92 is cooled by the bypass airflow 44. However, other cold sink flows could be utilized within the scope and contemplation of this disclosure. Water 114 may be initially extracted and the second exhaust flow 84 initially cooled by the second condenser 92. An initial or precooling of the second exhaust gas flow 84 may aid water extraction downstream in the condenser 50.

Referring to FIG. 5 with continued reference to FIG. 4, a fuel injection nozzle 100 is schematically shown along a nozzle axis 104. The nozzle 100 provides for injection of the fuel flow 38 and a steam flow 112 into a combustor cavity 102. The steam flow 112 may be one of or a combination of the flows 96, 98. The example nozzle 100 is one example of targeted use of water extracted in the condenser 50. In nozzle 100 the steam flow 112 shrouds the fuel flow 38 as illustrated in the embodiment shown in FIG. 5. The steam flow 112 and fuel flow 38 may also be mixed and remain within the contemplation of this disclosure. A targeted amount of the steam flow 112 provides for the elimination of certain products of combustion and also controls stabilization of combustion of hydrogen fuels.

In the disclosed nozzle 100, the steam flow 112 is injected through an annular channel or a plurality of radially outward openings surrounding the inner fuel flow 38. The inner fuel flow 38 proceeds through a central opening disposed along the central nozzle axis 104 as is shown. Although an example nozzle 100 is shown, other nozzle configurations that combine steam or water flow with the fuel flow may be utilized and are within the contemplation and scope of this disclosure.

Figure 6:
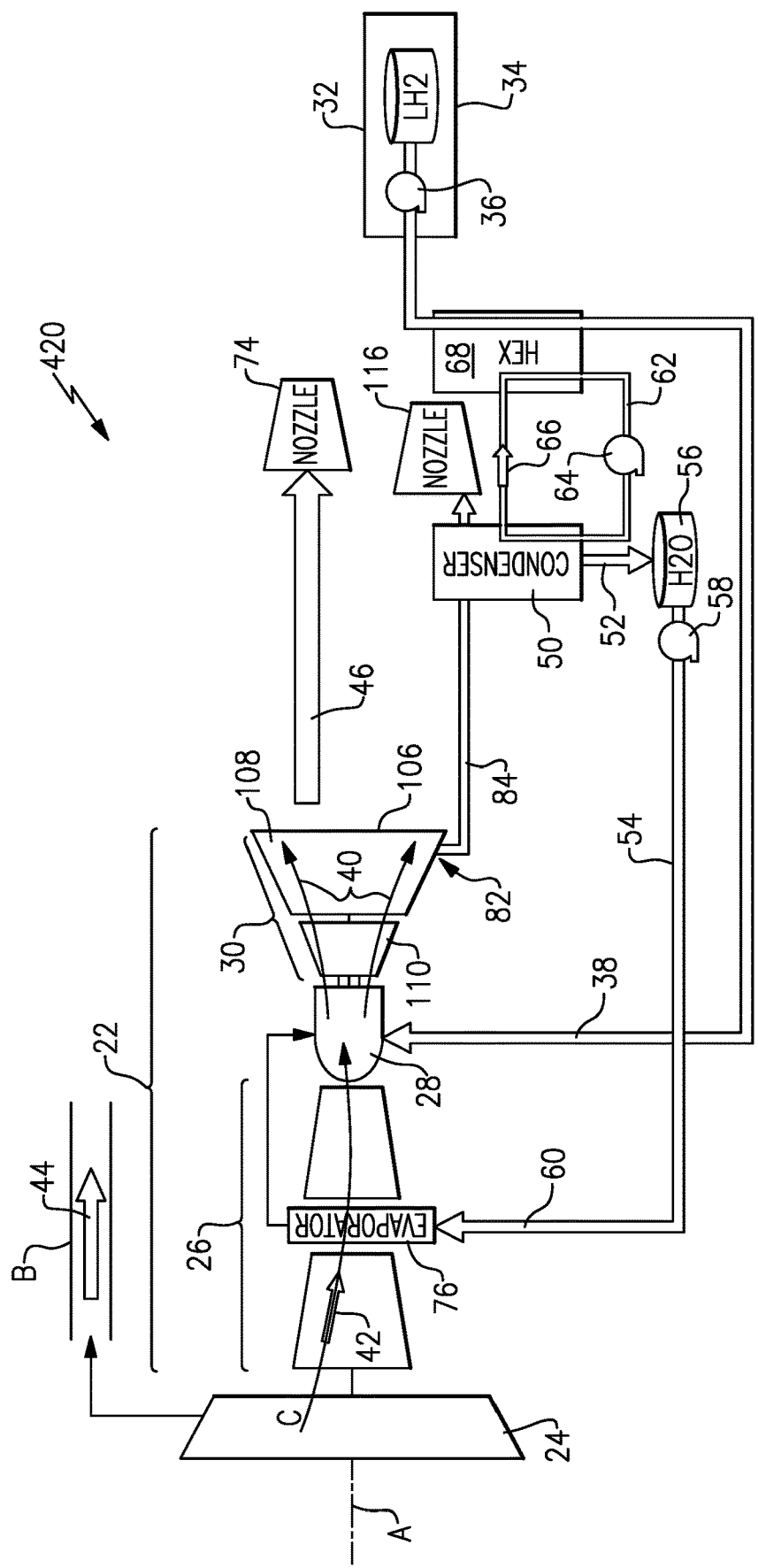
FIG. 6 is a schematic view of still another example aircraft propulsion system embodiment.

Referring to FIG. 6, another example propulsion system is schematically shown and indicated at 420 and includes a second nozzle 116. In the illustrated example, the second exhaust gas flow 84 is drawn from the location 82 forward of the aft exit opening 106. A portion of water is extracted from the second exhaust gas flow 84 in the condenser 50 utilizing a combination of the refrigeration circuit 62 and the fuel flow 38 as a cold sink. Although the example cold sink is shown as the cryogenic fuel flow 38, other cold sink, such as the bypass airflow 44 could also be utilized and are within the contemplation of this disclosure.

Exhaust gas exiting the condenser 50 is communicated through the second nozzle 116 instead of being recombined with the first exhaust gas flow 46. By not recombining the first and second exhaust gas flows 46, 84, complications caused by differing pressures and flow are eliminated. Accordingly, the example propulsion system 420 does not includes a mixer or other features for addressing the differences in exit pressures between the separated first and second exhaust gas flows 46, 84.

Several example propulsion systems are disclosed by way of example with features that compliment operation with the split exhaust gas flows. Although specific features and components are described by way of example in combination, each of the features and components described in the various example embodiments could be combined differently and remain within the contemplation and scope of this disclosure.

Accordingly, extraction of water from only a portion of the exhaust gas flow as is shown and illustrated by the disclosed example propulsion systems can alleviate challenges presented by condensing all of the exhaust gas flow and combined with targeting the extracted water to specific uses can improve engine efficiency.

Although an example embodiment has been disclosed, this disclosure is not intended to be just a material specification but is instead illustrative such that a worker of ordinary skill in this art would recognize that certain modifications are within the scope and contemplation of this disclosure. For that reason, the following claims should be studied to determine the scope and content of this disclosure.

What is claimed is:

1. An aircraft propulsion system comprising:
a compressor section where an inlet airflow is compressed to generate a compressed airflow;
a combustor section where the compressed airflow is mixed with fuel and ignited to generate an exhaust gas flow that is communicated through a core flow path;
a turbine section through which the exhaust gas flow expands to generate a mechanical power output, wherein the exhaust gas flow is split into at least a first exhaust gas flow and a second exhaust gas flow, wherein the second exhaust gas flow is of a flow volume that is less than that of the first exhaust gas flow; and
a condenser where water is extracted from the second exhaust gas flow to generate an extracted water flow; and
a first heat exchanger where at least a portion of the extracted water flow is utilized for cooling a core flow along the core flow path.

2. The aircraft propulsion system as recited in claim 1, including a fuel system for communication of a fuel flow to the combustor section, wherein a portion of the fuel flow is in thermal communication with the condenser for cooling the second exhaust gas flow.

3. The aircraft propulsion system as recited in claim 1, including a refrigerant circuit heat exchanger for transferring thermal energy between the condenser and a cold sink.

4. The aircraft propulsion system as recited in claim 3, wherein the cold sink comprises a cryogenic fuel flow and further including a turboexpander where a portion of a heated fuel flow is expanded to generate a cooled fuel flow that is thermally communicated with the refrigerant circuit heat exchanger.

5. The aircraft propulsion system as recited in claim 1, including a secondary condenser where a fan bypass airflow is placed in thermal communication with the second exhaust gas flow.

6. The aircraft propulsion system as recited in claim 1, wherein the first heat exchanger is in thermal communication with a portion of the core flow where the extracted water flow is heated to generate a steam flow, and wherein the steam flow is injected into the core flow path.

7. The aircraft propulsion system as recited in claim 6, wherein the steam flow is communicated to a fuel nozzle of the combustor section for injection with a flow of fuel.

8. The aircraft propulsion system as recited in claim 1, wherein at least a portion of the extracted water flow is injected as an intercooling flow into the core flow path through at least one injection location.

9. The aircraft propulsion system as recited in claim 1, including an exhaust flow turbine through which the first exhaust gas flow is expanded to generate shaft power.

10. The aircraft propulsion system as recited in claim 1, wherein the first exhaust gas flow is exhausted from an aft exit of the turbine section and the second exhaust gas flow is tapped from a location in the turbine section that is upstream of the aft exit.

11. An aircraft propulsion system comprising:
a compressor section where an inlet airflow is compressed to generate a compressed airflow;
a combustor section where the compressed airflow is mixed with fuel and ignited to generate an exhaust gas flow that is communicated through a core flow path;
a turbine section through which the exhaust gas flow expands to generate a mechanical power output, wherein the exhaust gas flow is split into at least a first exhaust gas flow and a second exhaust gas flow; and
a condenser where water is extracted from the second exhaust gas flow to generate an extracted water flow;
a first heat exchanger where at least a portion of the extracted water flow is utilized for cooling a core flow along the core flow path; and
a control device configured to vary a ratio of the first exhaust gas flow to the second exhaust gas flow and a controller programmed to operate the control device based upon information indicative of at least one operating condition.

12. An aircraft propulsion system comprising:
a compressor section where an inlet airflow is compressed to generate a compressed airflow;
a combustor section where the compressed airflow is mixed with fuel and ignited to generate an exhaust gas flow that is communicated through a core flow path;
a turbine section through which the exhaust gas flow expands to generate a mechanical power output, wherein the exhaust gas flow is split into at least a first exhaust gas flow and a second exhaust gas flow; and
a condenser where water is extracted from the second exhaust gas flow to generate an extracted water flow;
a first heat exchanger where at least a portion of the extracted water flow is utilized for cooling a core flow along the core flow path; and
a mixer where the first exhaust gas flow and the second exhaust gas flow are recombined and exhausted through a nozzle.

13. The aircraft propulsion system as recited in claim 12, further including a controller programmed to operate at least one control device configured to control recombination of the first exhaust gas flow and the second exhaust gas flow, wherein the at least one control device comprises one of a turbine, a valve or the mixer.

14. A turbine engine assembly comprising:
a core engine defining a core flow path and configured to generate an exhaust gas flow;
a condenser configured to receive a partial portion of the exhaust gas flow and to extract water from the partial portion of the exhaust gas flow to generate an extracted water flow, wherein the partial portion of the exhaust gas flow is tapped from a location in the turbine section that is upstream of an aft exit; and
a first heat exchanger where at least a portion of the extracted water flow is utilized for cooling a core flow along the core flow path.

15. The turbine engine assembly as recited in claim 14, wherein the first heat exchanger is in thermal communication with a portion of the core flow where the extracted water flow is heated to generate a steam flow, and wherein the steam flow is injected into the core flow path.

16. The turbine engine assembly as recited in claim 14, including a fuel system generating a fuel flow, wherein a portion of the fuel flow is in thermal communication with a refrigerant circuit for cooling the partial portion of the exhaust gas flow.

17. A method of operating a turbine engine including a cryogenic fuel system comprising:
splitting a total exhaust gas flow into a first exhaust gas flow and a second exhaust gas flow such that the second exhaust gas flow is of a flow volume less than that of the first exhaust gas flow;
cooling the second exhaust gas flow to condense water into a liquid form, wherein a portion of a cryogenic fuel flow from the cryogenic fuel system accepts thermal energy from the second exhaust gas flow;
extracting liquid water from the partial portion of the second exhaust gas flow to generate an extracted water flow; and
cooling a portion of a core flow along a core flow path by injecting a portion of the extracted water flow into the core flow path.

18. The method as recited in claim 17, further comprising generating a steam flow from at least a portion of the extracted water flow and injecting the steam flow into the core flow path of the turbine engine.

* * * * *